US010618016B2

(12) United States Patent
Lee

(10) Patent No.: US 10,618,016 B2
(45) Date of Patent: Apr. 14, 2020

(54) BUBBLE WATER MACHINE AND PORTABLE PRESSURE BOTTLE

(71) Applicant: TRIPLE S TECHNOLOGIES INC., New Taipei (TW)

(72) Inventor: Chien-Chung Lee, New Taipei (TW)

(*) Notice: Subject to any disclaimer, the term of this patent is extended or adjusted under 35 U.S.C. 154(b) by 351 days.

(21) Appl. No.: 15/695,023

(22) Filed: Sep. 5, 2017

(65) Prior Publication Data

US 2018/0333688 A1 Nov. 22, 2018

(30) Foreign Application Priority Data

May 17, 2017 (TW) .............................. 106116312 A

(51) Int. Cl.
| | | |
|---|---|---|
| *B01F 3/04* | (2006.01) | |
| *B67D 1/04* | (2006.01) | |
| *B01F 13/00* | (2006.01) | |
| *A47J 31/36* | (2006.01) | |
| *A47J 31/44* | (2006.01) | |

(52) U.S. Cl.
CPC ...... *B01F 3/04794* (2013.01); *B01F 13/0033* (2013.01); *B67D 1/0456* (2013.01); *A47J 31/36* (2013.01); *A47J 31/4489* (2013.01)

(58) Field of Classification Search
CPC ............. B01F 3/04794; B01F 13/0033; B67D 1/0456; A47J 31/36
USPC ........ 99/323.2; 141/9, 83, 95, 144, 146, 147
See application file for complete search history.

(56) References Cited

U.S. PATENT DOCUMENTS

| | | | | |
|---|---|---|---|---|
| 4,005,807 A | * | 2/1977 | Wiesner ................... | B67D 3/02 222/442 |
| 5,909,824 A | * | 6/1999 | Qian ...................... | G01F 11/263 222/1 |
| 6,286,730 B1 | * | 9/2001 | Amidzich ............ | B67D 1/0802 137/212 |
| 6,463,964 B2 | * | 10/2002 | Clusserath .............. | B67C 3/065 141/104 |
| 7,958,917 B2 | * | 6/2011 | Conforti ................... | B67C 3/10 141/198 |
| 8,636,179 B2 | * | 1/2014 | Menard ................ | B67D 3/0045 222/1 |
| 8,695,647 B2 | * | 4/2014 | Ruble ................... | B67C 3/2628 141/147 |

(Continued)

FOREIGN PATENT DOCUMENTS

| | | |
|---|---|---|
| CN | 1394668 A | 2/2003 |
| CN | 203749200 U | 8/2014 |

(Continued)

*Primary Examiner* — Thien S Tran

(57) ABSTRACT

The present invention provides a bubble water machine comprising a portable pressure bottle and an inflation area, wherein the portable pressure bottle includes a first container body, a top cover, a first base, an upper positioning assembly, a lower positioning assembly and a plug. The inflation area comprises a second container body, a second base, a first intermediary assembly, a second intermediary assembly and a third intermediary assembly. The beneficial effects of the present invention lie in: the bubble water machine can prevent a liquid from rushing back to the machine stand when the liquid containing sugar or alcohol is being inflated with a gas, and the portable pressure bottle can remain the gas in the liquid for a long time.

14 Claims, 27 Drawing Sheets

(56) References Cited

U.S. PATENT DOCUMENTS

| | | | | |
|---|---|---|---|---|
| 2005/0092390 A1* | 5/2005 | Krulitsch | ................ | B67C 3/242 |
| | | | | 141/144 |
| 2006/0144865 A1 | 7/2006 | Yoshida et al. | | |
| 2014/0312144 A1* | 10/2014 | Hui | .................... | B05B 11/0056 |
| | | | | 239/302 |
| 2015/0144663 A1* | 5/2015 | Noel | ...................... | A45D 34/00 |
| | | | | 222/383.1 |
| 2015/0239643 A1* | 8/2015 | Kim | ................... | B05B 11/3023 |
| | | | | 222/153.14 |

FOREIGN PATENT DOCUMENTS

| | | |
|---|---|---|
| CN | 204218672 U | 3/2015 |
| CN | 104582509 A | 4/2015 |
| TW | 201138880 A | 11/2011 |

\* cited by examiner

BUBBLE WATER MACHINE AND PORTABLE PRESSURE BOTTLE

BACKGROUND OF THE INVENTION

Field of the Invention

The present invention relates to a bubble water machine and portable pressure bottle, more particularly, to a bubble water machine capable of preventing the liquid in the bottle from rushing back into the machine body and a portable pressure bottle remaining the gas for a long time.

Description of Related Art

With reference to FIG. 1, a well-known bubble water machine 1 is shown. When the bubble water machine 1 is in use, a drinking water is needed to pour into a dedicated container 12. Then, the bottle mouth of the container 12 is locked fixedly in the bubble water machine 1 and an air guide tube 11 of the bubble water machine 1 protrudes into the container 12 (under the water level) from the top. Next, a user operates the bubble water machine 1 to output carbon dioxide, which will enter downward into the drinking water of the container 12 along the air guide tube 1, thereby making the drinking water transform into a bubble water. However, in the instance when the carbon dioxide is output into the drinking water, the internal pressure of the container 12 adds increasingly and thus the drinking water will rush upward back into the body of the bubble water machine 1 with the carbon dioxide. Therefore, when the drinking water is inflated, sugar additives and alcohol cannot be added previously so as not to result in the sugar additives or alcohol rushing back into the body of the bubble water machine 1.

Furthermore, when the container 12 is separated from the bubble water machine 1, the carbon dioxide in the bubble water may quickly leak into the air, just as the soft drink which is opened. Thus, the container 12 cannot preserve the carbon dioxide within the bubble water for a long time. In addition, if the bubble water is needed to be inflated again (now the bubble water has been added with the sugar additives and alcohol), the sugar additives and alcohol in the bubble water will pollute and damage the bubble water machine 1.

As such, it should be considered by those skilled in the art that how to both prevent the liquid in the bottle from rushing back into the machine body and preserve the carbon dioxide in the bubble water for a long time.

SUMMARY OF THE INVENTION

The purpose of the present invention is to provide a bubble water machine and portable pressure bottle, wherein the bubble water machine can prevent a liquid from rushing back to the machine stand when the liquid containing sugar or alcohol is being inflated with a gas, and the portable pressure bottle can remain the gas in the liquid for a long time.

The bubble water machine of the present invention comprises a portable pressure bottle and an inflation area, wherein the portable pressure bottle includes a first container body, a top cover, a first base, an upper positioning assembly, a lower positioning assembly and a plug. The inflation area comprises a second container body, a second base, a first intermediary assembly, a second intermediary assembly and a third intermediary assembly. The first container body is used for containing a liquid and the top cover is rotatably connected to the upper end of the container body. A first base is rotatably connected to the lower end of the first container body and provided with a rotatable connection assembly extending into the first container body which includes an upper rotatable connection portion and a lower rotatable connection portion. Wherein the upper positioning assembly is rotatably connected to the upper rotatable connection portion and has a balanced pressure structure; the lower positioning assembly is rotatably connected to the lower rotatable connection portion and includes a first intake passage. Furthermore, the balanced pressure structure abuts against the top of the plug and the bottom of the plug covers the first intake passage. Additionally, a second container body contains an inflation bottle including a nozzle. The first base is connected to the second base in a rotary engagement manner. The first intermediary assembly includes a second intake passage connected communicatably with the first intake passage. The second intermediary assembly including a trigger block and a plurality of third intake passages which are interconnected with the second intake passage. Furthermore, the third intermediary assembly includes a second accommodation slot and a third accommodation slot. The second accommodation slot is arranged with a third spring assembly inside and one end of the third spring assembly abuts against the second intermediary assembly. The third accommodation slot is located just below the second accommodation slot and used for rotatably connecting the nozzle, and between the second accommodation slot and the third accommodation slot is a third through hole, through which the trigger block passes.

Within above bubble water machine, the balanced pressure structure is constituted by a U-shaped plate structure and an elongated plate structure abutting against the center of the top of the plug.

Within above bubble water machine, the upper end of the second intermediary assembly abuts against the first intermediary assembly, and the first intermediary assembly drives the second intermediary assembly to move downward to allow the trigger block to contact the nozzle when the first base is rotatably engaged with the second base.

Within above bubble water machine, the second base is provided with at least one feedback assembly and further includes an extrusion block corresponding to the feedback assembly while the first base further includes a push block corresponding to the feedback assembly; wherein the feedback assembly includes a linkage casing, an elongated block and a fourth spring assembly. The push block abuts against the linkage casing, and one end of the elongated block is connected to the inner surface of the linkage casing. The fourth spring assembly is nested on the elongated block, the pressure block abuts against one end of the fourth spring assembly and the pressure block is adjacent to the end of the elongated block which is not connected with the linkage casing.

Within above bubble water machine, the top cover includes a protruded tubular block connected with a pressure relief cover body which includes inside a first accommodation slot including a first gas relief hole at the lower part and being provided inside a first pressure relief assembly, and the first pressure relief assembly comprises a first rotatable connection assembly, a first abutting assembly and a first spring assembly. Wherein the first rotatable connection assembly rotatably connected to the upper part of the first accommodation slot and includes a first through hole. The first abutting assembly is contained inside the first accommodation slot. One end of the first spring assembly abuts against the first rotatable connection assembly and another end abuts against the first abutting assembly. Wherein the first abutting assembly seals the first gas relief hole by the elasticity of the first spring assembly.

Within above bubble water machine, the third intermediary assembly further includes a fourth accommodation slot including a second gas relief hole at the lower part and being provided a second pressure relief assembly, and the second pressure relief assembly comprises a second rotatable connection assembly, a second abutting assembly and a second spring assembly. Wherein the second rotatable connection assembly is rotatably connected to one end of the fourth accommodation slot and includes a second through hole. The second abutting assembly is contained inside another end of the fourth accommodation slot. One end of the second spring assembly abuts against the second rotatable connection assembly and another end abuts against the second abutting assembly. Wherein the second abutting assembly seals the second gas relief hole by the elasticity of the second spring assembly.

Within above bubble water machine, the portable pressure bottle further comprises a rotation disk nested above the upper positioning assembly.

Within above bubble water machine, the top cover includes a ultra-thin area, which has a thickness smaller than the casing thickness of the first container body.

The bubble water machine of the present invention comprises a first container body, a top cover, a first base, an upper positioning assembly, a lower positioning assembly and a plug. A first container body is used to contain a liquid. A top cover is rotatably connected to the upper end of the first container body. The first base is rotatably connected to the lower end of the first container body, and the first base is provided with a rotatable connection assembly extending into the first container body which includes an upper rotatable connection portion and a lower rotatable connection portion. The upper positioning assembly is rotatably connected to the upper rotatable connection portion and has a balanced pressure structure. The lower positioning assembly is rotatably connected to the lower rotatable connection portion and includes a first intake passage. The balanced pressure structure abuts against the top of the plug and the bottom of the plug covers the first intake passage. Wherein the balanced pressure structure is constituted by a U-shaped plate structure and an elongated plate structure abutting against the center of the top of the plug.

Within above bubble water machine, it further comprises a first wave cushion arranged between the edge of the upper end of the first container body and the top cover.

Within above bubble water machine, the top cover projects a tubular block connected with a pressure relief cover body which includes inside a first accommodation slot including a first gas relief hole at the lower part and being provided inside a first pressure relief assembly, wherein the first pressure relief assembly comprises a first rotatable connection assembly, a first abutting assembly and a first spring assembly. The first rotatable connection assembly is rotatably connected to the upper part of the first accommodation slot and includes a first through hole. The first abutting assembly is contained below the first accommodation slot. One end of the first spring assembly abuts against the first rotatable connection assembly and another end abuts against the first abutting assembly. Wherein the first abutting assembly seals the first gas relief hole by the elasticity of the first spring assembly.

Within above bubble water machine, the first abutting assembly includes an air guide hole and the pressure relief further includes a clear block located in the first accommodation slot; the clear block is adjacent closely to the air guide hole when the first abutting assembly seals the first gas relief hole.

Within above bubble water machine, it further comprises a filter assembly arranged below the first accommodation slot and including a plurality of filter holes.

Within above bubble water machine, it further comprises a second wave cushion arranged between the edge of the upper end of the tubular block and the pressure relief cover body.

DETAILED DESCRIPTION OF THE INVENTION

Figure 1:
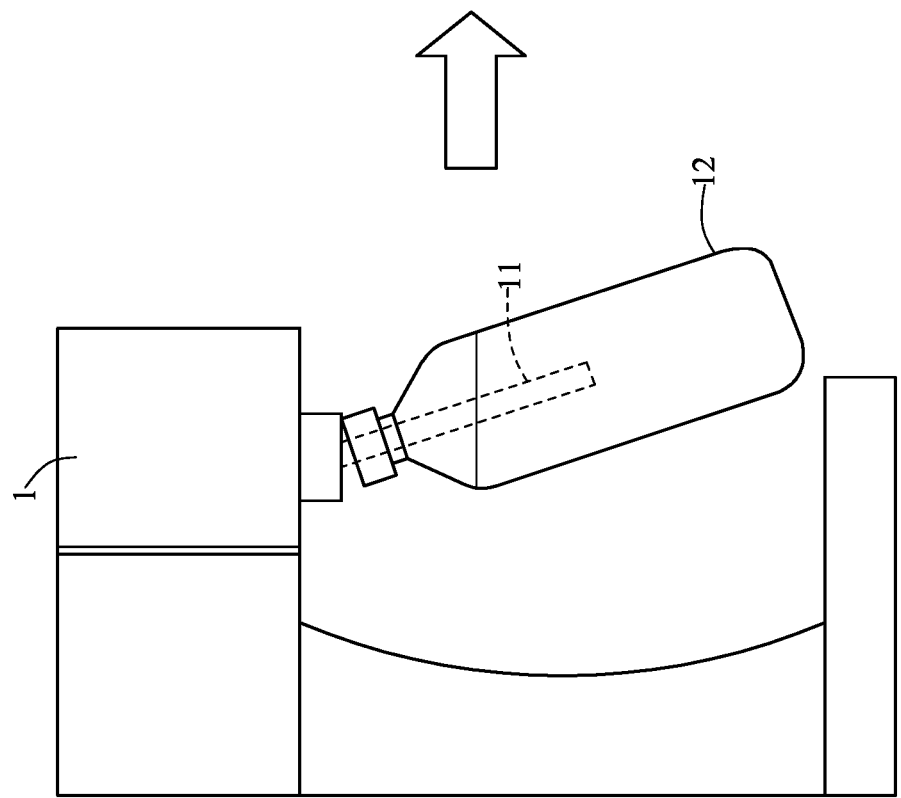
FIG. 1 illustrates a traditional bubble water machine 1.
Figure 2A:
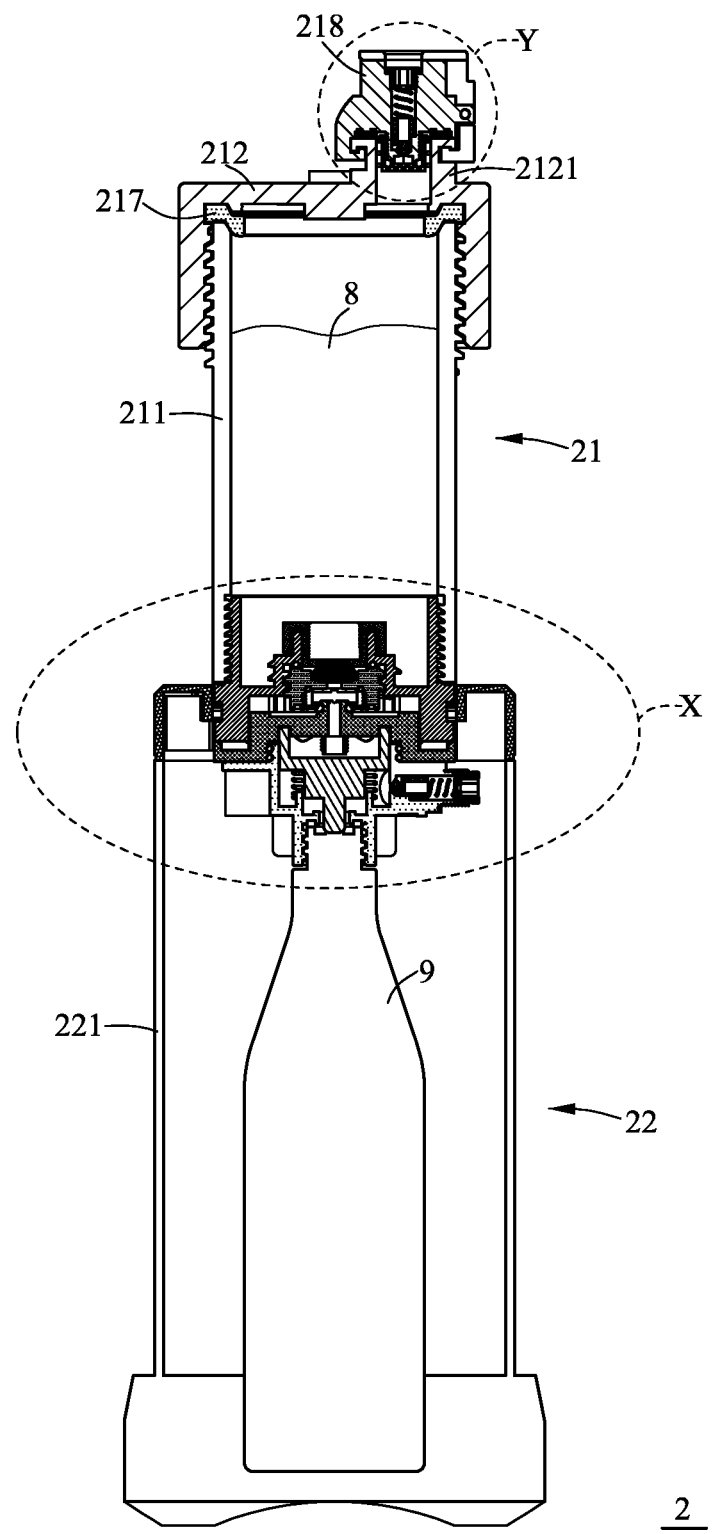
FIG. 2A illustrates a full cross-section view of the bubble water machine 2 according to the first embodiment.
Figure 2B:
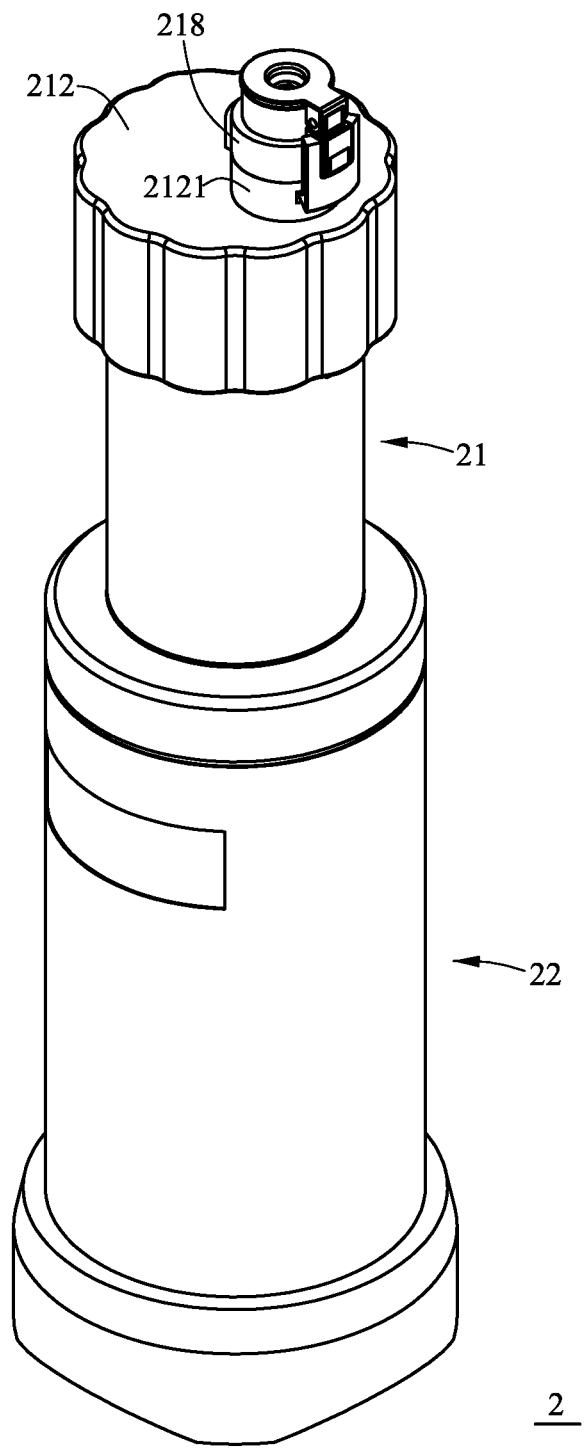
FIG. 2B illustrates a stereoscopic view of the bubble water machine 2 according to the first embodiment.
Figure 2C:
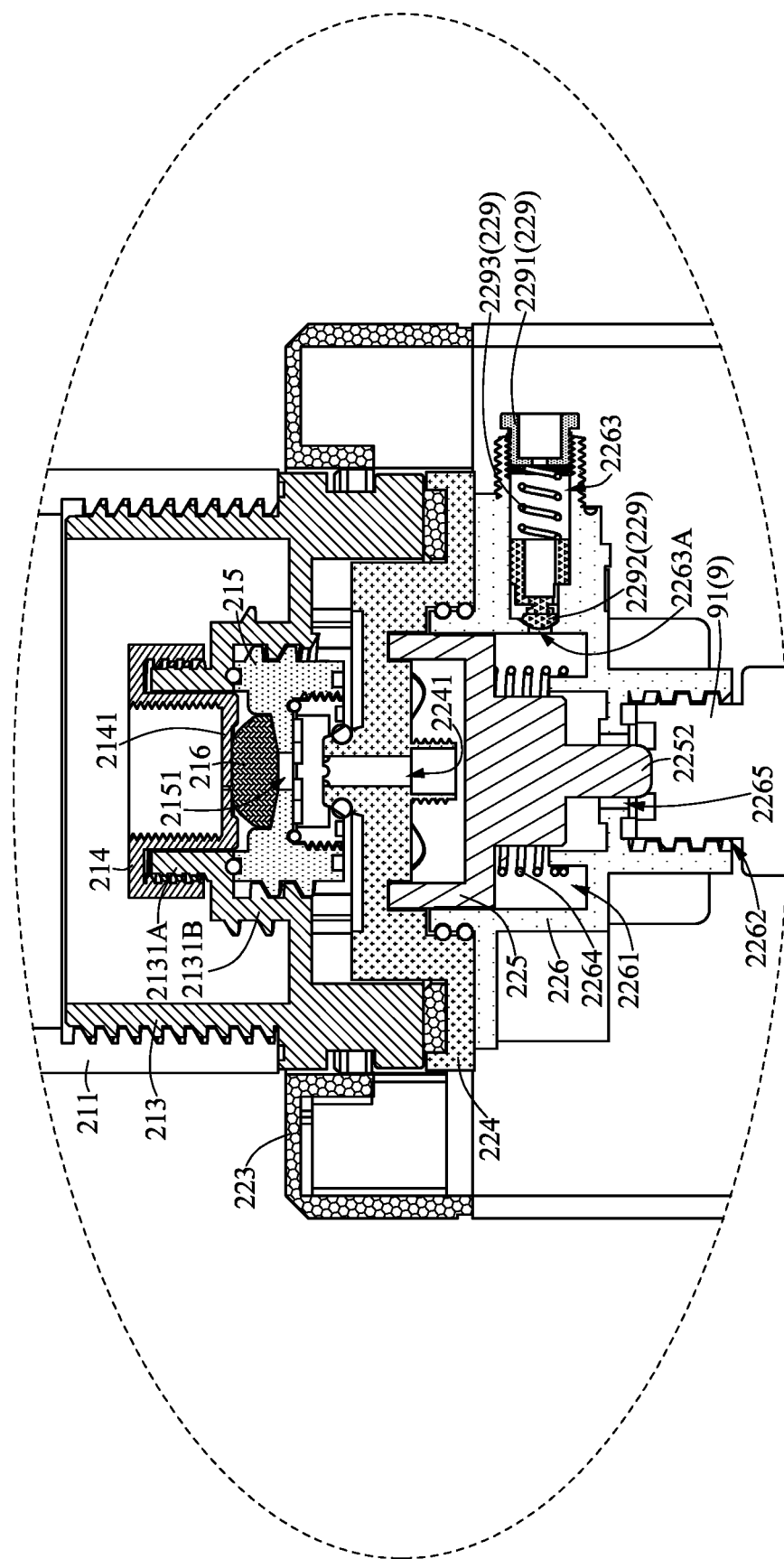
FIG. 2C illustrates an enlarge view of indication X in FIG. 2A.
Figure 3:
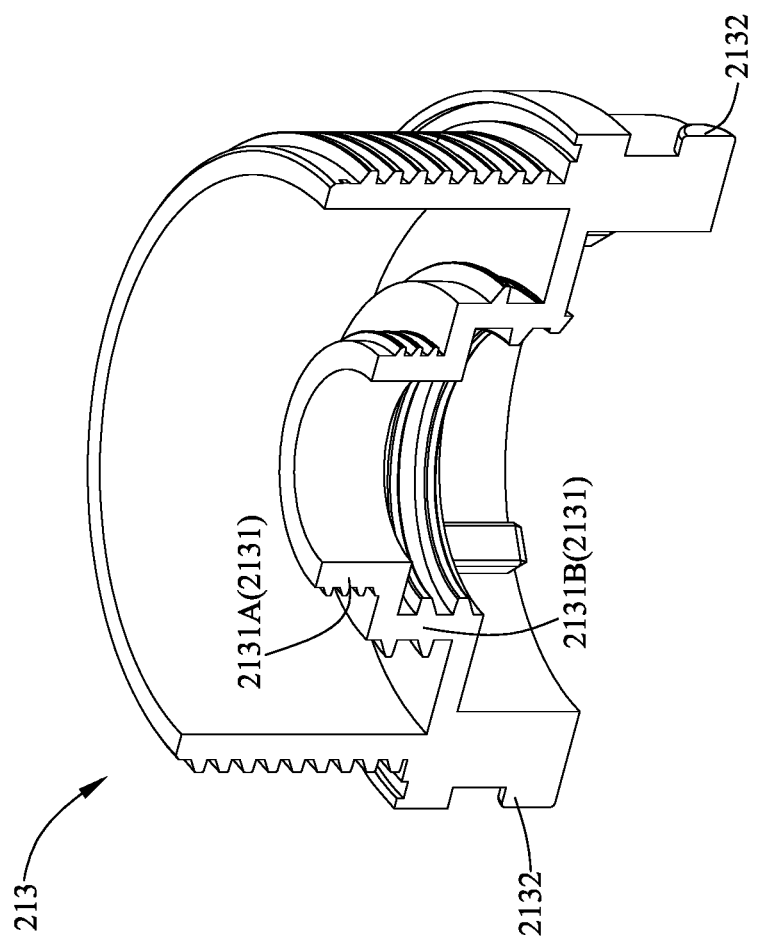
FIG. 3 illustrates a stereoscopic cross-section view of first base 213.
Figure 4:
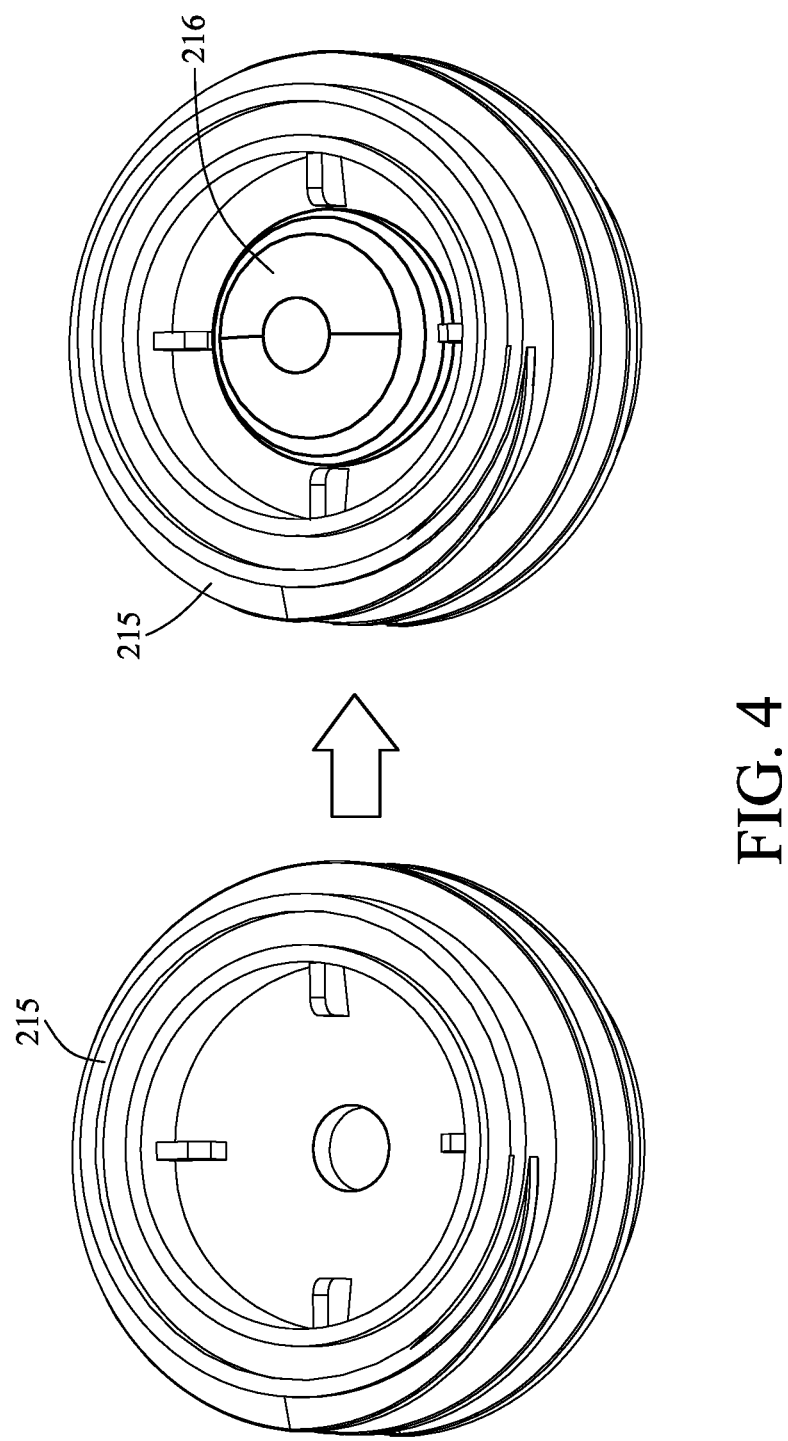
FIG. 4 illustrates a view in which plug 216 covers first intake passage 2151.
Figure 5:
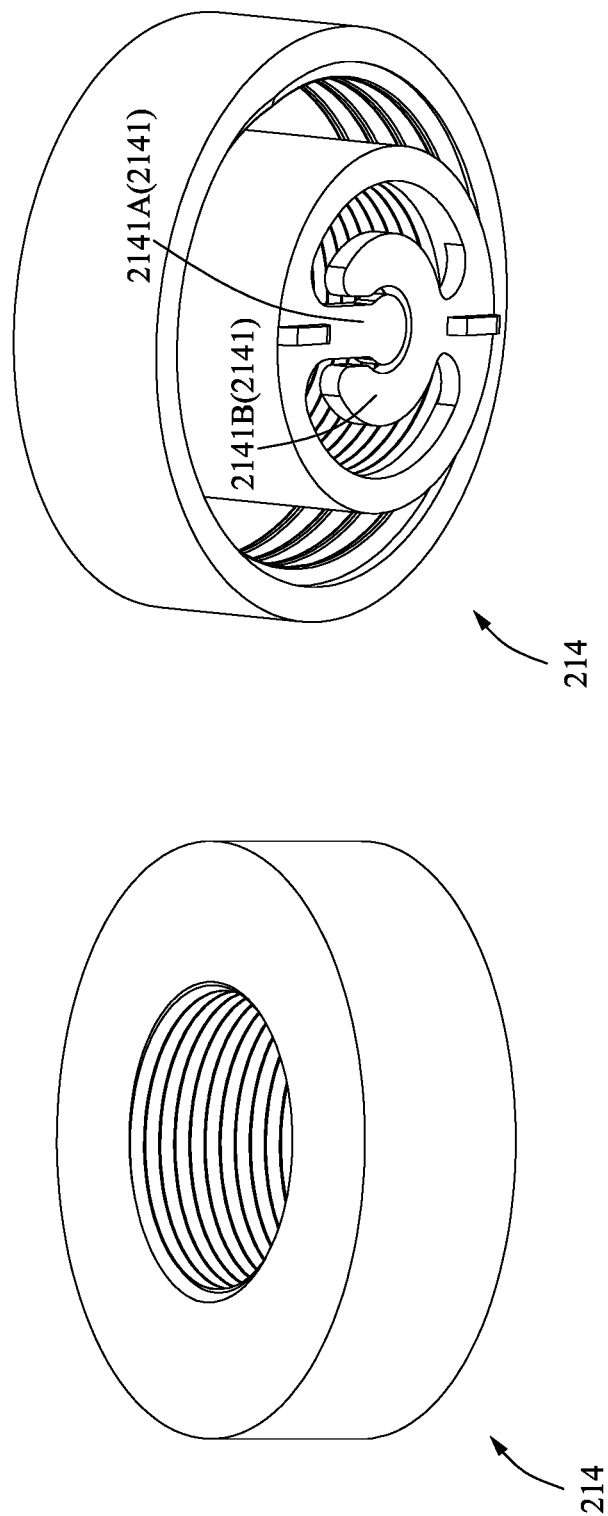
FIG. 5 illustrates a stereoscopic view of upper positioning assembly 214 in different perspectives.

With reference to FIGS. 2A, 2B and 2C, FIG. 2A illustrates a full cross-section view of the bubble water machine 2 according to the first embodiment, FIG. 2B illustrates a stereoscopic view of the bubble water machine 2 according to the first embodiment, FIG. 2C illustrates an enlarge view of indication X in FIG. 2A. The bubble water machine 2 comprises a portable pressure bottle 21 and an inflation area 22. Wherein the portable pressure bottle 21 includes a first container body 211, a top cover 212, a first base 213, an upper positioning assembly 214, a lower positioning assembly 215 and a plug 216. The inflation area 22 comprises a second container body 221, a second base 223, a first intermediary assembly 224, a second intermediary assembly 225, a third intermediary assembly 226 and at least one feedback assembly 227 (with previous reference to FIG. 12). Wherein the first container body 211 is used for containing a liquid 8 such as drinking water, drinks with sugar-contained additives or with alcohol and the top cover 212 is rotatably connected to the upper end of the container body 211. Furthermore, the first base 213 is rotatably connected to the lower end of the first container body 211 and provided with a rotatable connection assembly 2131 extending into the first container body 211 which itself includes an upper rotatable connection portion 2131A and a lower rotatable connection portion 2131B (see FIG. 3, which illustrates a stereoscopic cross-section view of the first base 213). Wherein the upper positioning assembly 214 is rotatably connected to the upper rotatable connection portion 2131A and has a balanced pressure structure 2141 which abuts against the top of the plug 216. In addition, the lower positioning assembly 215 is rotatably connected to the lower rotatable connection portion 2131B and includes a first intake passage 2151. And when the balanced pressure structure 2141 abuts against the top of the plug 216, the bottom of the plug 216 may cover the first intake passage 2151 (see FIG. 4, which illustrates a view in which plug 216 covers first intake passage 2151). Thus, the liquid 8 may not flow into the inflation area 22 though the first intake passage 2151, and the portable pressure bottle 21 can preserve the liquid 8. In above descriptions, the balanced pressure structure 2141 is constituted by a U-shaped plate structure 2141B and an elongated plate structure 2141A (see FIG. 5, which a stereoscopic view of upper positioning assembly 214 in different perspectives), and both the U-shaped plate structure 2141B and elongated plate structure 2141A are an elastomer. Wherein the elongated plate structure 2141A may abut against the center of the top of the plug 216, and the U-shaped plate structure 2141B abuts against the non-center of the top of the plug 216.

Figure 6:
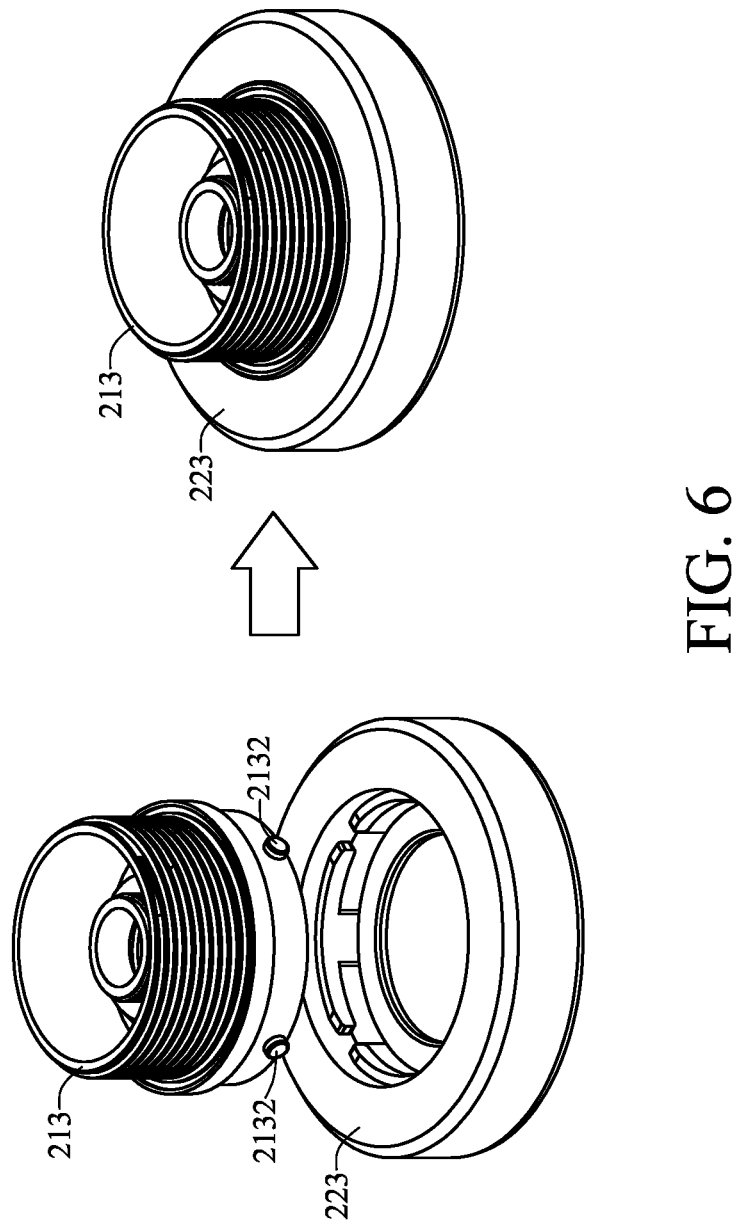
FIG. 6 illustrates a view in which first base 213 is connected to second base 223.
Figure 7:
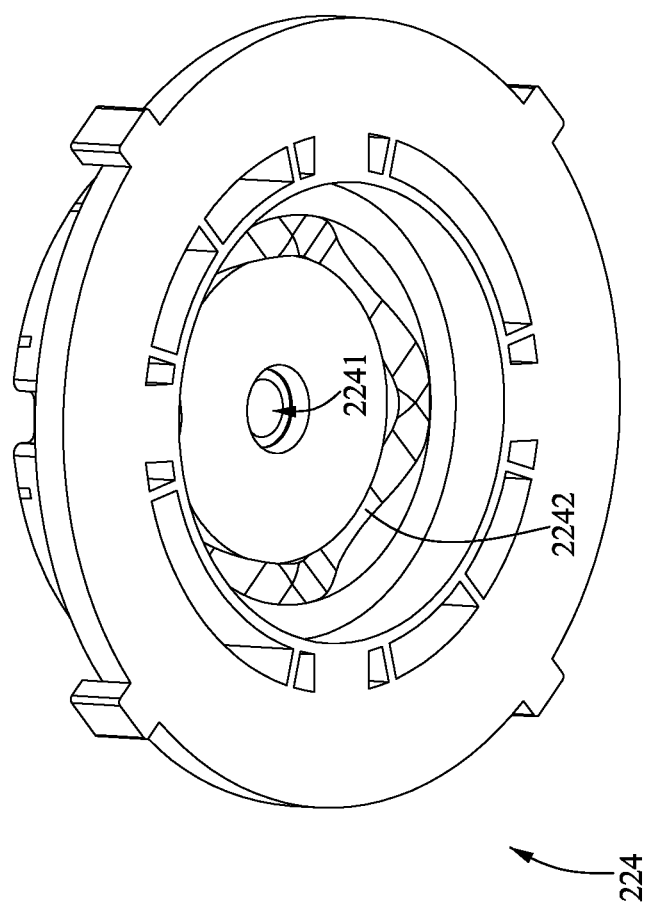
FIG. 7 illustrates a stereoscopic view of first intermediary assembly 224.
Figure 8:
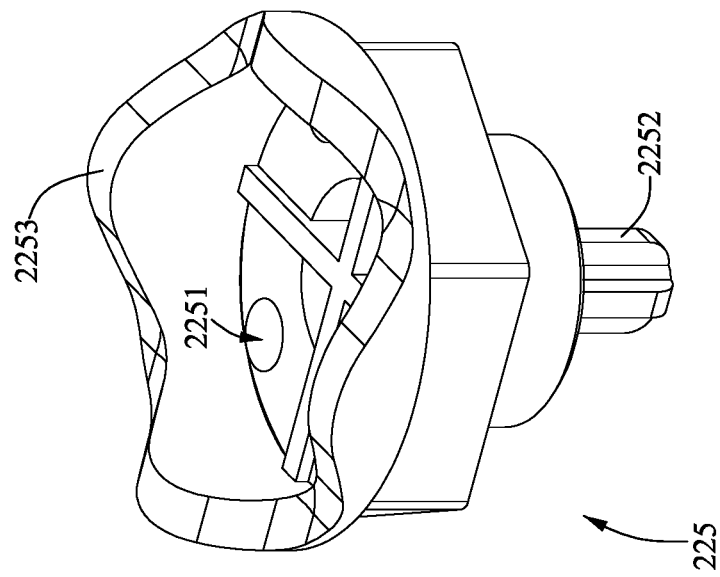
FIG. 8 illustrates a stereoscopic view of second intermediary assembly 225.
Figure 8:
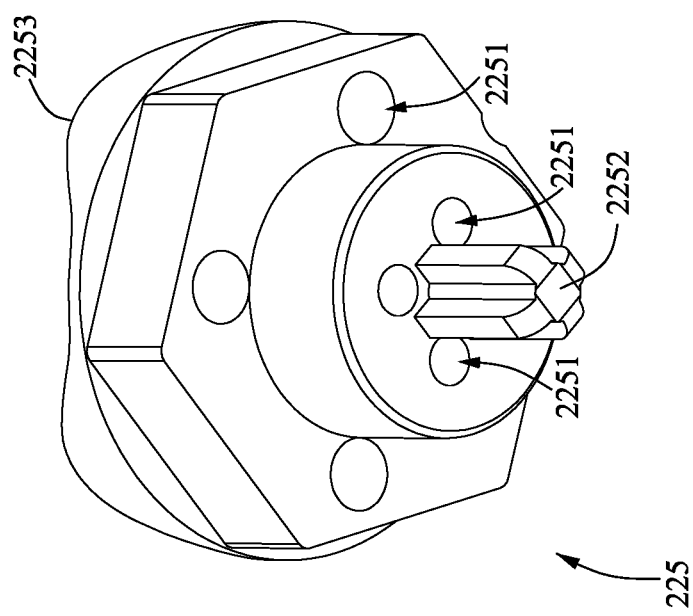

Additionally, a second container body 221 contains an inflation bottle 9 including a nozzle 91. The first base 213 is connected to the second base 223 in a rotary engagement manner (see FIG. 6, which illustrates a view in which first base 213 is connected to second base 223). Furthermore, the first intermediary assembly 224 is linked below the first base 213 and includes a second intake passage 2241 connected communicatably with the first intake passage 2151. And the first intermediary assembly 224 includes a first wave projected block 2242 (see FIG. 7, which illustrates a stereoscopic view of first intermediary assembly 224). Next, with reference to FIG. 8, a stereoscopic view of second intermediary assembly 225 is shown. The second intermediary assembly 225 includes a trigger block 2252 and a plurality of third intake passages 2251 which are interconnected with the second intake passage 2241. In addition, the third intermediary assembly 226 includes a second accommodation slot 2261 and a third accommodation slot 2262 and a fourth accommodation slot 2263, wherein the second accommodation slot 2261 is arranged with a third spring assembly 2264 inside and one end of the third spring assembly 2264 abuts against the second intermediary assembly 225. Thus, the second intermediary assembly 225 is subjected to the upward force exerted by the third spring assembly 2264, so the upper end of the second intermediary assembly 225 may abut against the first intermediary assembly 224. In above descriptions, since the first base 213 is connected to the second base 223 in a rotary engagement manner, the portable pressure bottle 21 can easily separate from the inflation area 22 (see FIG. 2F, which is a view illustrating the state in which portable pressure bottle 21 is separated from inflation area 22).

Furthermore, the third accommodation slot 2262 is located just below the second accommodation slot 2261 and used for rotatably connecting the nozzle 91, and between the second accommodation slot 2261 and the third accommodation slot 2262 is a third through hole 2265, through which the trigger block 2252 passes. In above descriptions, the second intermediary assembly also comprises a second wave projected block 2253 corresponding to the first wave projected block 2242 (see FIG. 8 again), and the second wave projected block 2253 contacts the first wave projected block 2242 (subjected to the upward force exerted by the third spring assembly 2264). Thus, when the first base 213 is ratatably engaged with the second base 223, the first base 213 may drive the first intermediary assembly 224 to rotate simultaneously. As such, the topmost of the second wave projected block 2253 may abut against the topmost of the first wave projected block 2242 to allow the second intermediary assembly 225 to move downward, thereby the trigger block 2252 contacting the nozzle 91. And when the trigger block 2252 contacts the nozzle 91, the nozzle 91 may eject out the gas from the inflation bottle 9, and the gas may be transmitted to the second intake passage 2241 through the third intake passage 2251. Then, the gas will be transmitted to the first intake passage 2151 through the second intake passage 2241. Next, the plug 216 may be forced by the gas to open upward the balanced pressure structure 2141, so the first intake passage 2241 may be transformed into the state of conduction. Then, the gas will be transmitted into the liquid 8 through the first intake passage 2241. Therefore, the liquid 8 having received the gas may transformed into bubble water, bubble drinks with sugar-contained additives or with alcohol, and also the gas may drive the liquid 8 to impinge upward on the top cover 212, so the liquid 8 (bubble drinks with sugar or alcohol) may not rush downward back into the inflation area 22. As such the sugar additives and alcohol may not pollute or damage the components inside the inflation area 22. In above descriptions, when the gas stops forcing the plug 216, the plug 216 may again seal the first intake passage 2151. Thus, the liquid 8 may not flow into the inflation area 22.

Figure 9:
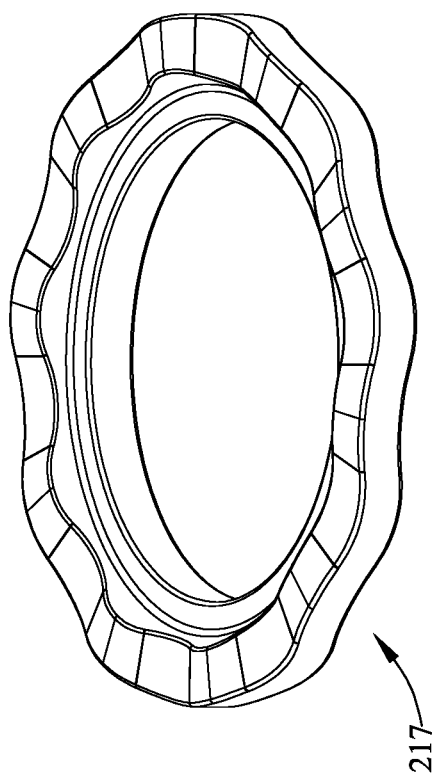
FIG. 9 illustrates a stereoscopic view of first wave cushion 217.

With reference to FIG. 2A again and to FIG. 9 that illustrates a stereoscopic view of first wave cushion 217, the portable pressure bottle 21 further comprises a first wave cushion 217 arranged between the edge of the upper end of the first container body 211 and the top cover 212. Therefore, in an instance that the top cover 212 is opened, the wave structure of the first wave cushion 217 can release the gas in the portable pressure bottle 21 such that the top cover 212 may not be bounced off suddenly by an excessively strong gas.

Figure 10:
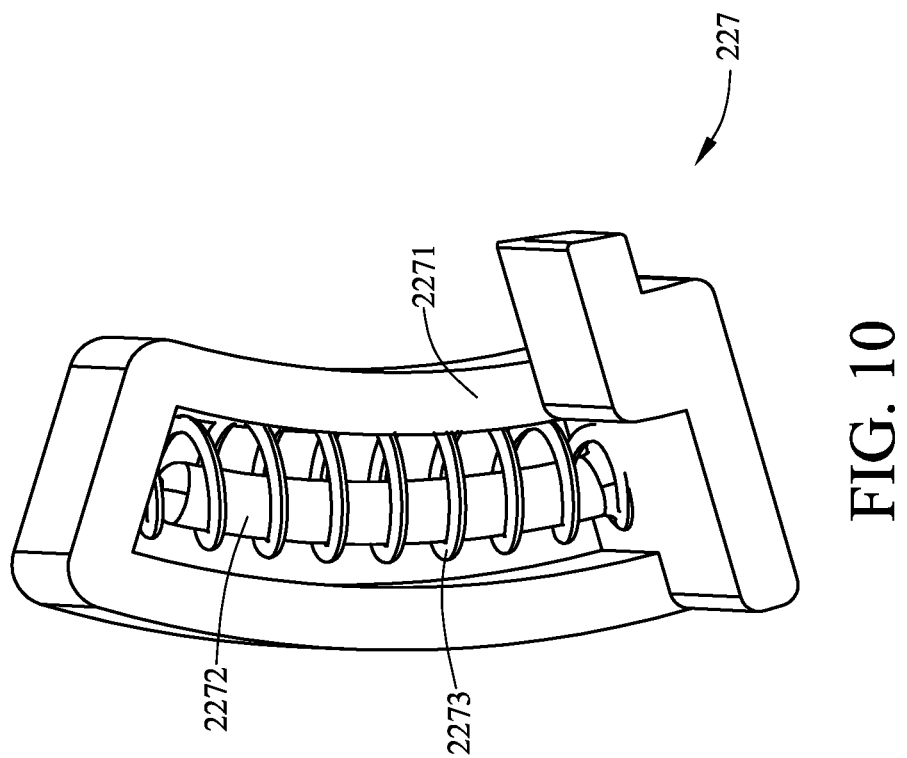
FIG. 10 illustrates a stereoscopic view of feedback assembly 227.
Figure 11:
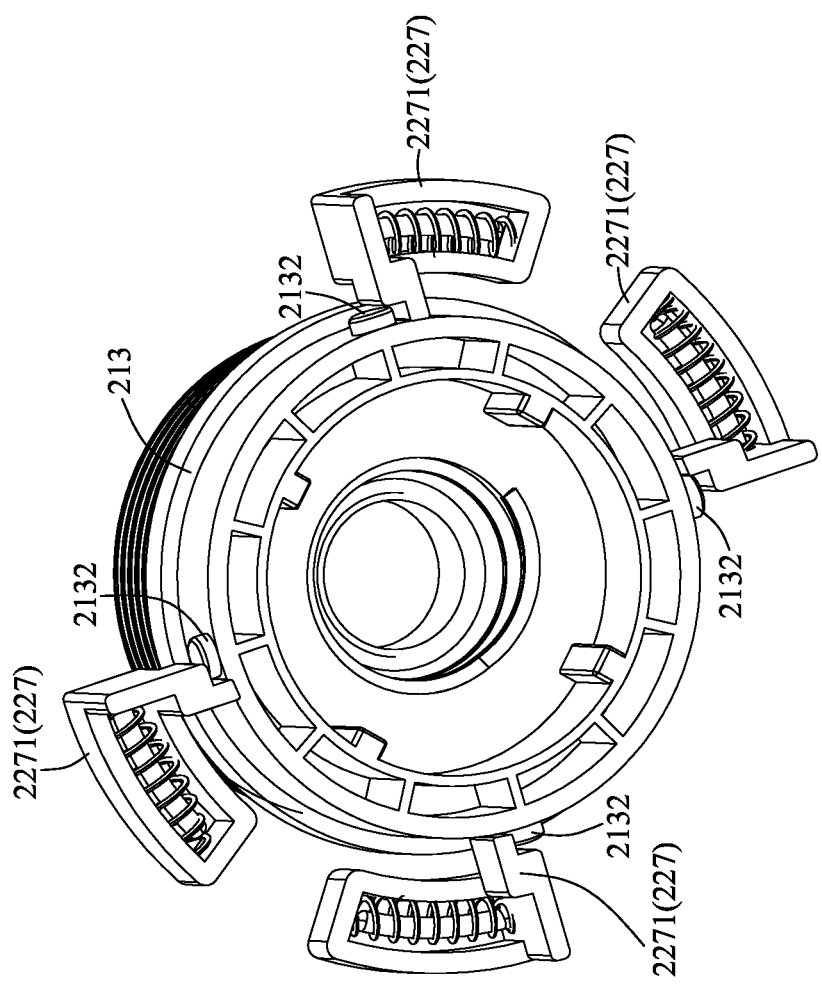
FIG. 11 illustrates a view of the relative positions of first base 213 and feedback assembly 227.
Figure 12:
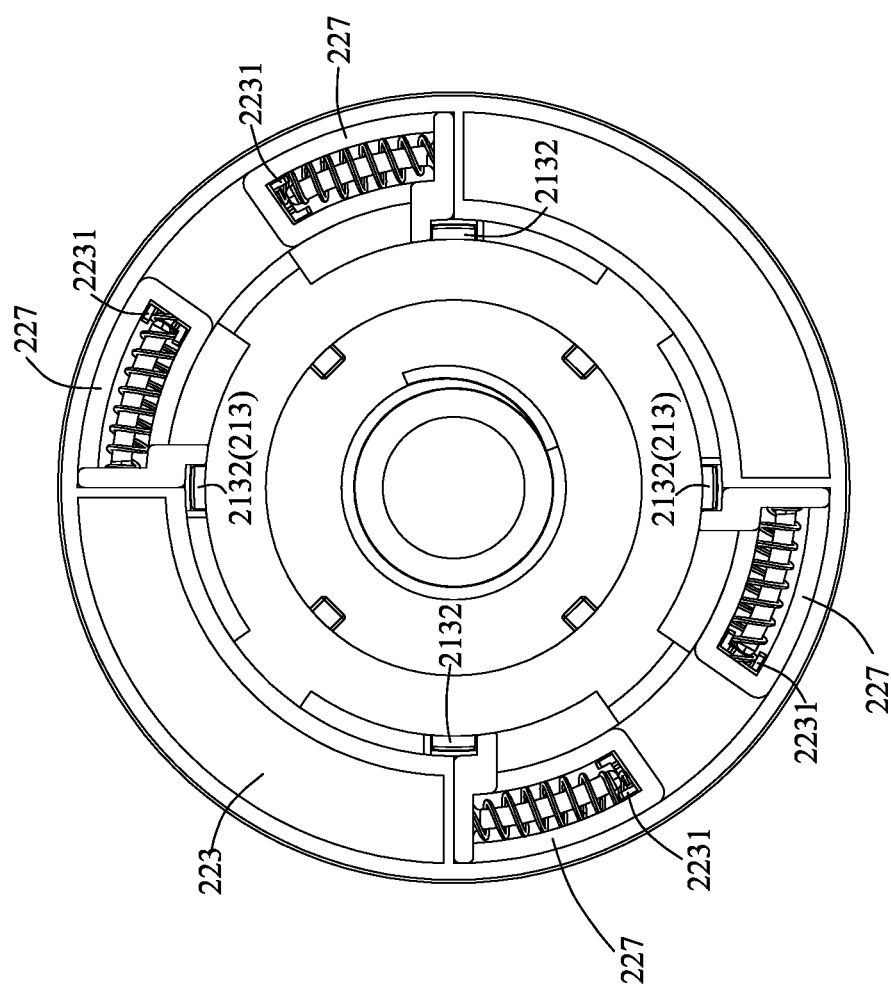
FIG. 12 illustrates a view of the relative positions of first base 213, second base 223 and feedback assembly 227.

With reference to FIGS. 10, 11 and 12, wherein FIG. 10 illustrates a stereoscopic view of feedback assembly 227, FIG. 11 illustrates a view of the relative positions of first base 213 and feedback assembly 227 and FIG. 12 illustrates a view of the relative positions of first base 213, second base 223 and feedback assembly 227. The second base 223 is provided with at least one feedback assembly 227 (four feedback assemblies 227 in the present embodiment) and further includes an extrusion block 2231 corresponding to the feedback assembly 227 while the first base further includes a push block 2132 corresponding to the feedback assembly. The feedback assembly 227 includes a linkage casing 2271, an elongated block 2272 and a fourth spring assembly 2273. Wherein the push block 2132 abuts against the linkage casing 2271, and one end of the elongated block 2272 is connected to the inner surface of the linkage casing 2271, and the fourth spring assembly 2273 is nested on the elongated block 2272. And also the pressure block 2231 abuts against one end of the fourth spring assembly 2273 and the pressure block 2231 is adjacent to the end of the elongated block 2272 which is not connected with the linkage casing 2271. As such, when the first base 213 is rotatably engaged with the second base 223, the push block 2132 may push the corresponding lineage casing 2271 simultaneously. Meanwhile, since the second base 223 is static, the extrusion block 2231 may press the fourth spring assembly 2273 to allow the fourth spring assembly 2273 to generate a returning elasticity. Then, the returning elasticity may force the linkage casing 2271 back to the original position. Thus, the linkage casing 2271 also drives the first base 213 such that the first base 213 rotates back to the original position.

Figure 2D:
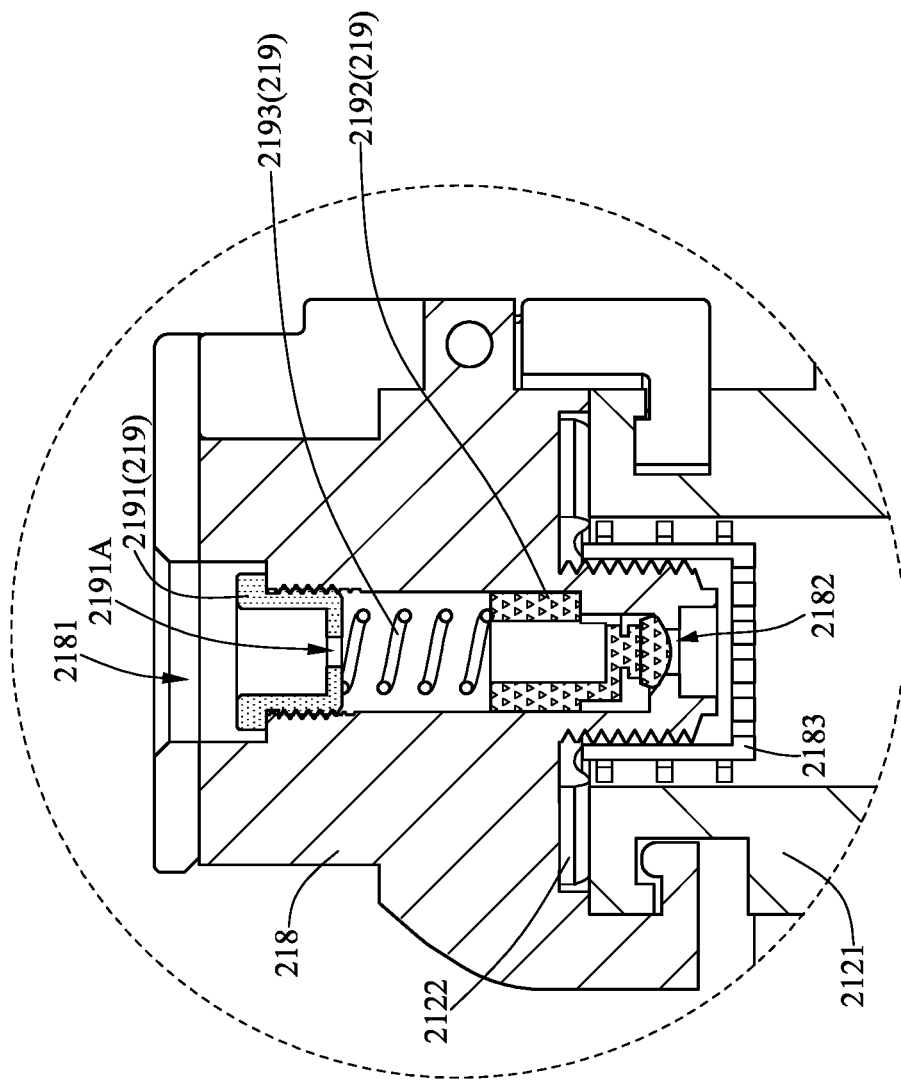
FIG. 2D illustrates an enlarge view of indication Y in FIG. 2A.
Figure 2E:
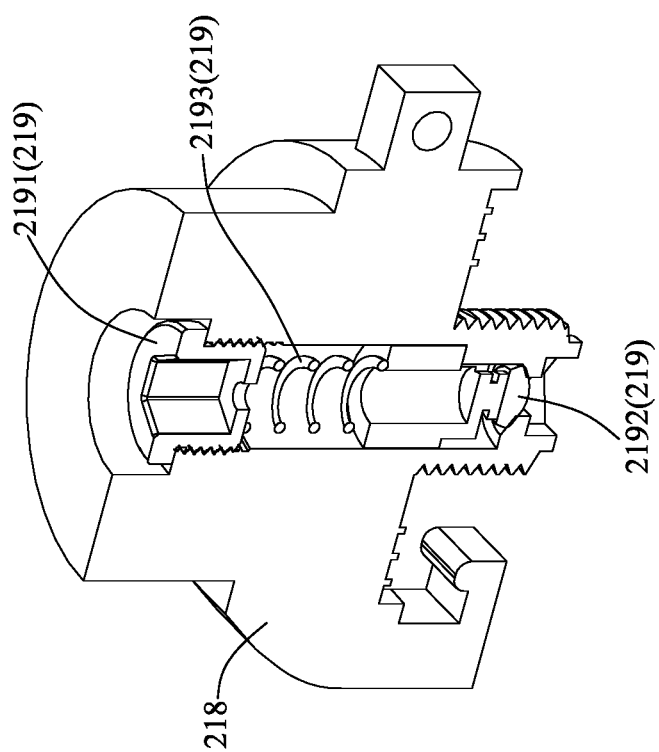
FIG. 2E is a stereoscopic cross-section view of pressure relief cover body 218 and first pressure relief assembly 219.
Figure 2F:
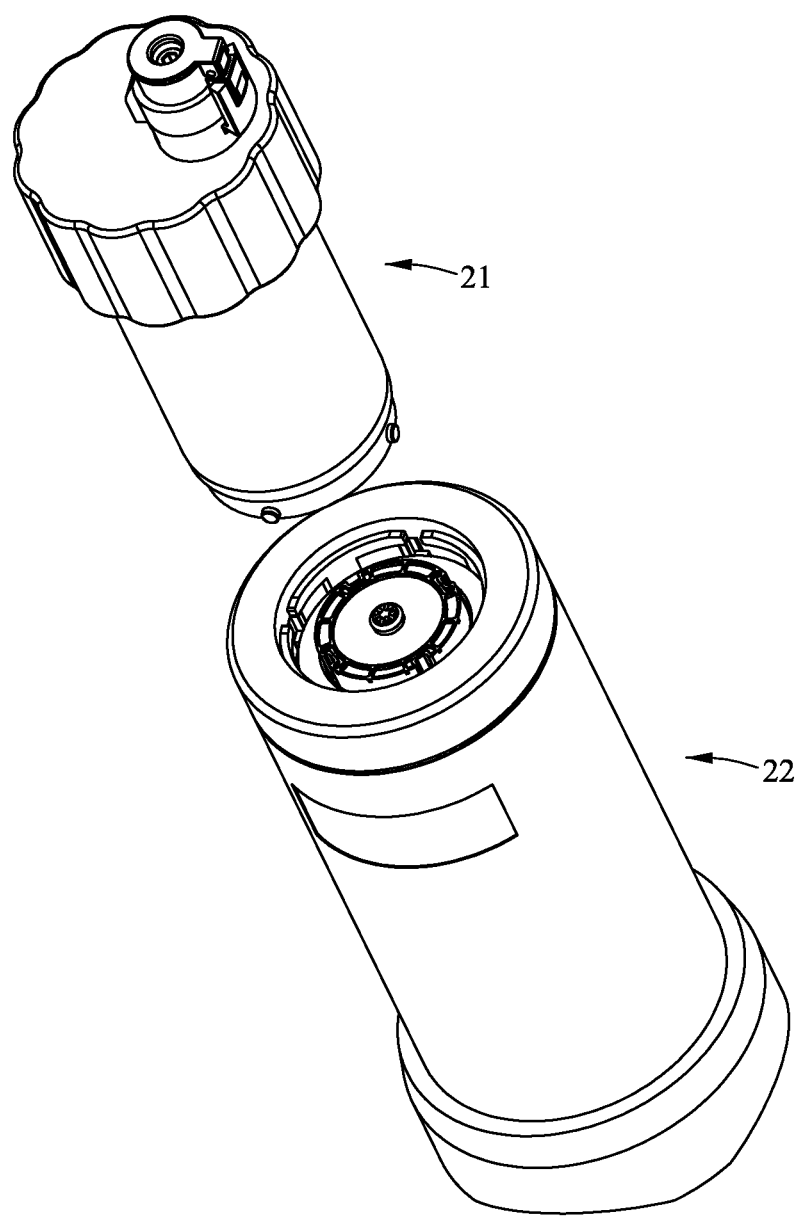
FIG. 2F is a view illustrating the state in which portable pressure bottle 21 is separated from inflation area 22.

In addition, with reference again to FIG. 2A and to FIGS. 2D and 2E, wherein FIG. 2D illustrates an enlarge view of indication Y in FIG. 2A, FIG. 2E is a stereoscopic cross-section view of pressure relief cover body 218 and first pressure relief assembly 219. The top cover 212 includes a projected tubular block 2121 connected with a pressure relief cover body 218. Wherein the pressure relief cover body 218 includes inside a first accommodation slot 2181 including a first gas relief hole 2182 at the lower part and being provided inside a first pressure relief assembly 219, and the first pressure relief assembly 219 comprises a first rotatable connection assembly 2191, a first abutting assembly 2192 and a first spring assembly 2193. Wherein the first rotatable connection assembly 2191 is rotatably connected to the upper part of the first accommodation slot 2181 and includes a first through hole 2191A, while the first abutting assembly 2192 is contained inside the first accommodation slot 2181. Additionally, one end of the first spring assembly 2193 abuts against the first rotatable connection assembly 2191 and another end abuts against the first abutting assembly 2192. Wherein the first abutting assembly 2192 seals the first gas relief hole 2182 by the elasticity of the first spring assembly 2193. As such, when the inner pressure of the first container body 211 is excessive, the first pressure relief assembly 219 can exhaust excess gas to help relieve pressure. In detail, if the inner gas of the liquid 8 is excessive, the first abutting assembly 2192 may be subjected to a upward-pushing force. Therefore, when the first spring assembly 2193 and first abutting assembly 2192 cannot withstand such force, the first abutting assembly 2192 may not seal the first gas relief hole 2182, and so the gas inside the first container body 211 may emit out through the first gas relief hole 2182 and first through hole 2191A. As such, the inner pressure of the first container body 211 can remain stable. In contrast, as the first spring assembly 2193 may appropriately seal the first gas relief hole 2182, the inner gas of the liquid 8 may not easily be emitted to the outside. As such, the portable pressure bottle 21 can preserve the gas in the liquid for a long time.

Figure 13A:
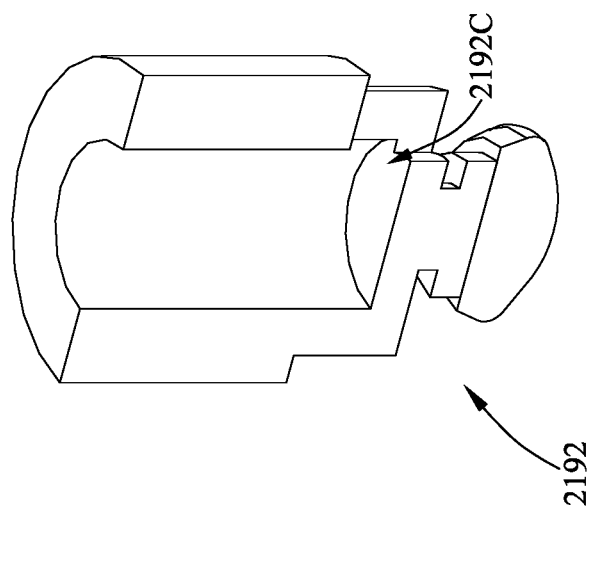
FIG. 13A illustrates a stereoscopic and stereoscopic cross-section view of first abutting assembly 2192.
Figure 13A:
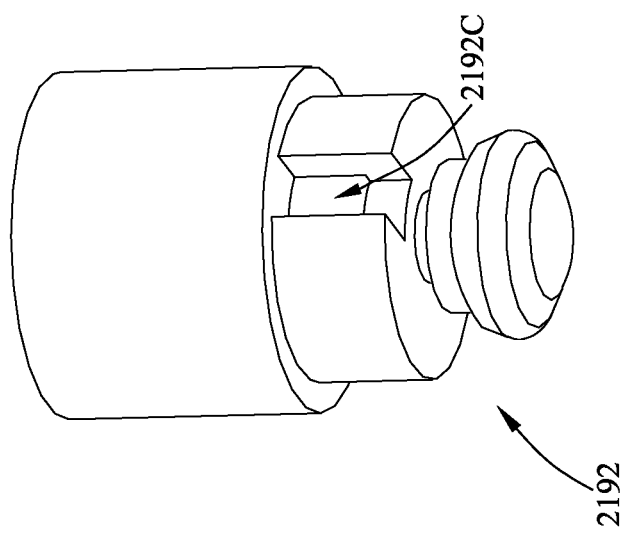
Figure 13B:
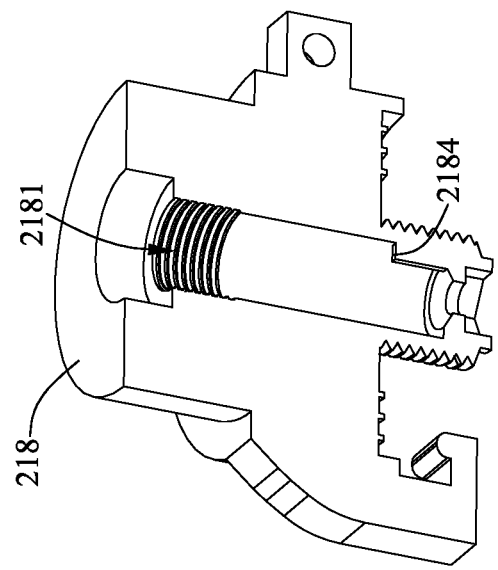
FIG. 13B is a stereoscopic and stereoscopic cross-section view of pressure relief cover body 218.
Figure 13B:
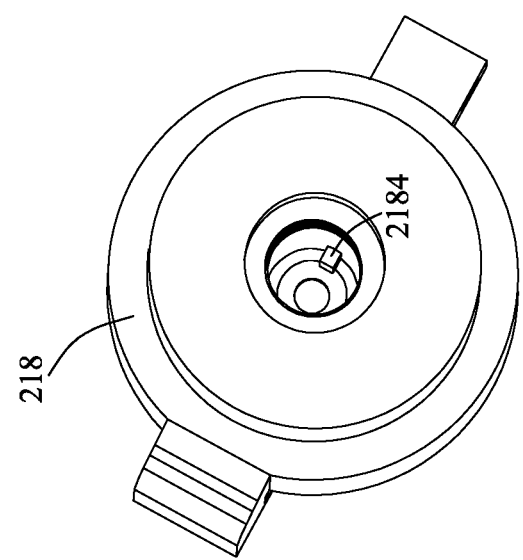
Figure 13C:
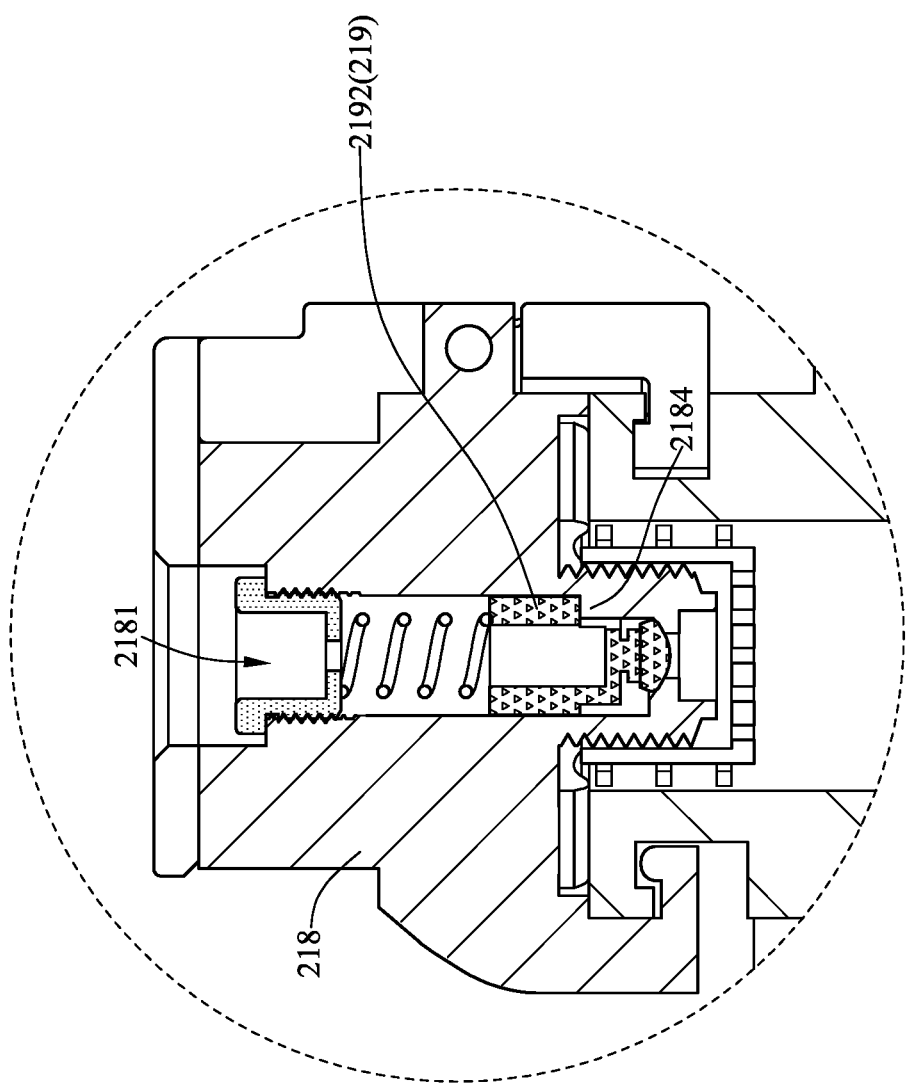
FIGS. 13C and 13D is a view of up and down movement of first abutting assembly 2192.
Figure 13D:
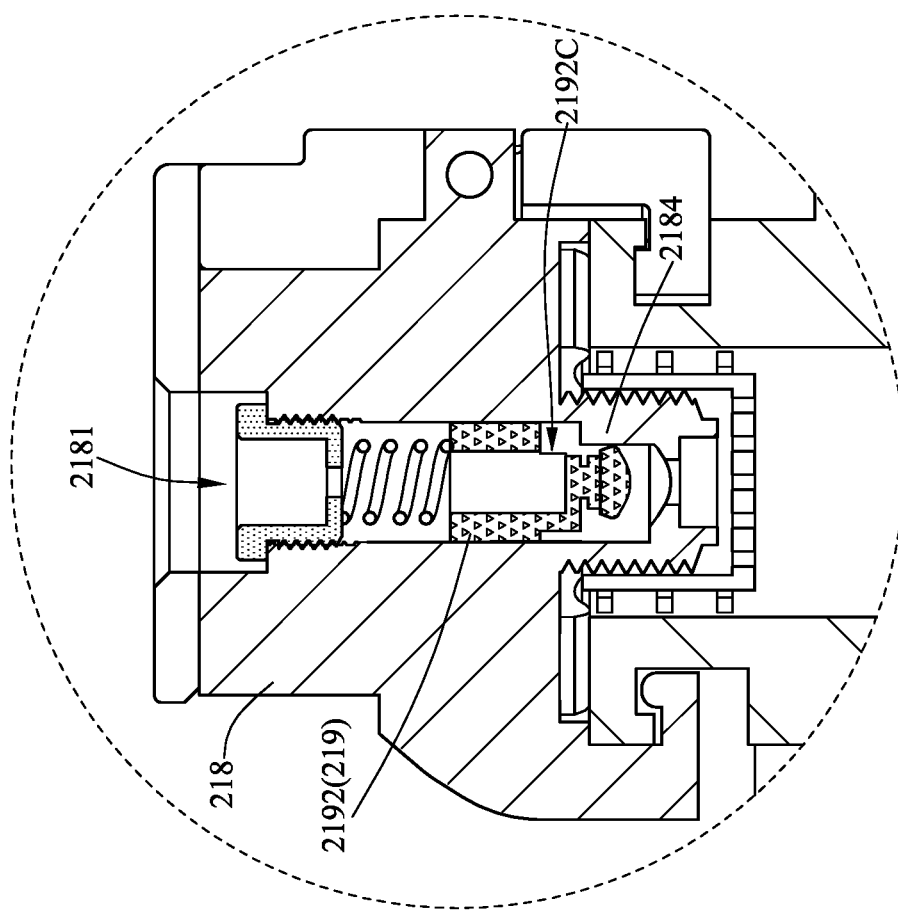

With reference to FIGS. 13A, 13B, 13C and 13D, wherein FIG. 13A illustrates a stereoscopic and stereoscopic cross-section view of first abutting assembly 2192 and FIG. 13B is a stereoscopic and stereoscopic cross-section view of pressure relief cover body 218. FIGS. 13C and 13D is a view of up and down movement of first abutting assembly 2192. The first abutting assembly 2192 includes an air guide hole 2192C and the pressure relief cover body 218 further includes a clear block 2184 located in the first accommodation slot. Wherein when the first abutting assembly 2192 seals the first gas relief hole 2182, the clear block 2184 is adjacent closely to the air guide hole 2192C (see FIG. 13C again). Thus, if the first abutting assembly 2192 moves up and down, the air guide hole 2192C may be sometimes adjacent to or sometimes away from the clear block 2184. As such, when there is syrup or residues in the air guide hole, the clear block 2184 may help in clearing them.

Figure 14:
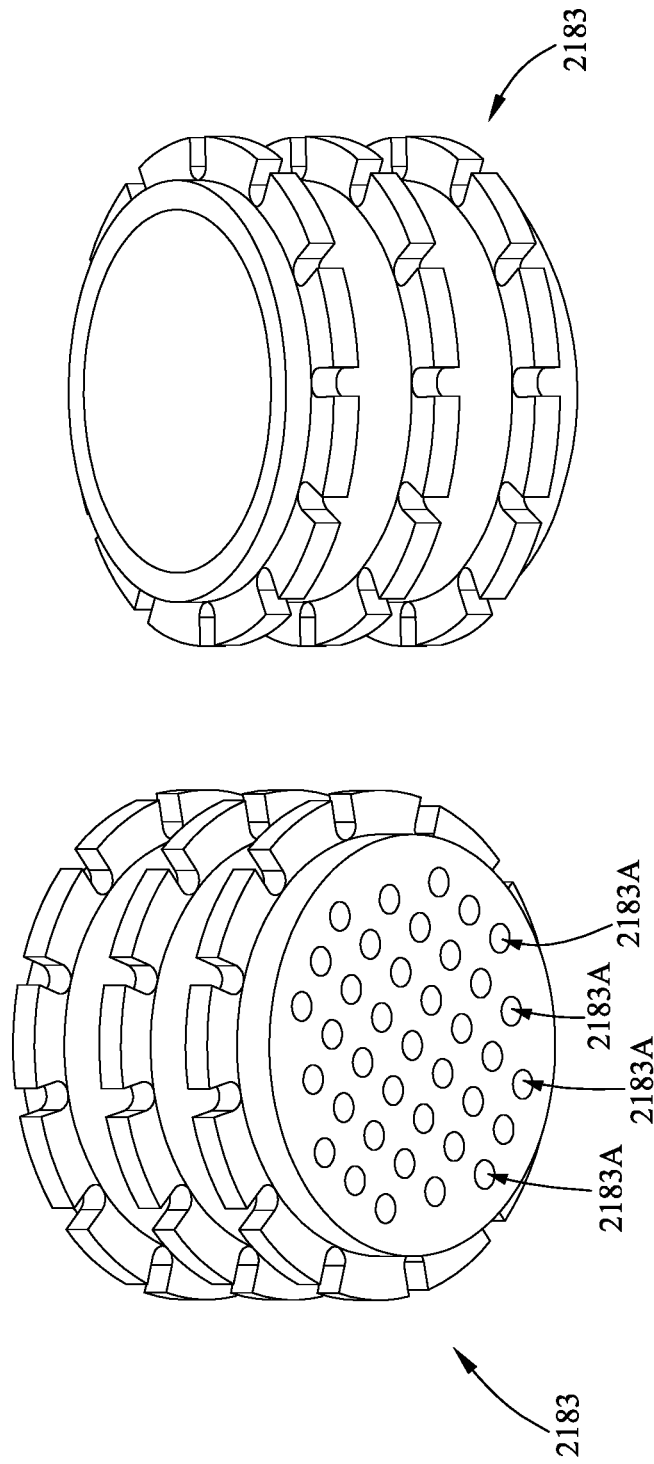
FIG. 14 illustrates a stereoscopic view of filter assembly 2183.

With reference to FIG. 2D again and to FIG. 14, FIG. 14 illustrates a stereoscopic view of filter assembly 2183, and the tubular block 2121 further comprises inside a filter assembly 2183 arranged below the first accommodation slot 2181 and including a plurality of filter holes 2183A. As such, when the liquid 8 emits a large amount of bubbles, the filter hole 2183A may prevent such large amount of bubbles from entering into the first accommodation slot 2181, so these bubbles may not emit out from the pressure relief cover body 218.

Figure 15:
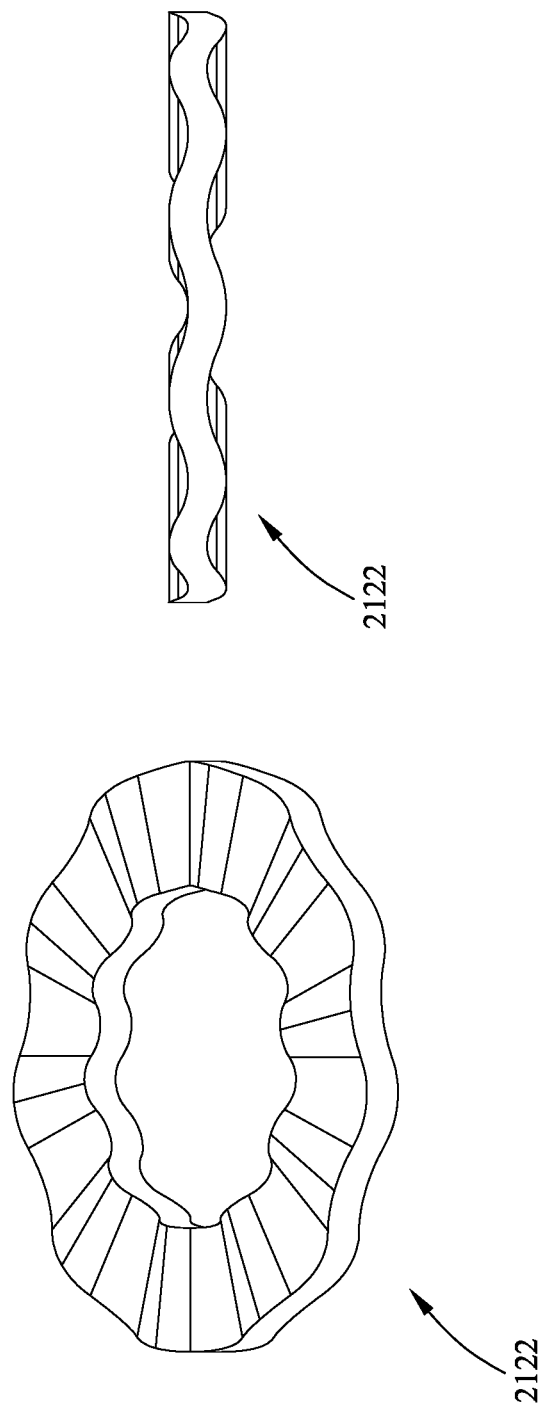
FIG. 15 illustrates a stereoscopic view of second wave cushion 2122.

With reference to FIG. 2D again and to FIG. 15, FIG. 15 illustrates a stereoscopic view of second wave cushion 2122. The second wave cushion 2122 is arranged between the edge of the upper end of the tubular block 2121 and the pressure relief cover body 218. Therefore, in an instance that the pressure relief cover body 218 is opened, the wave structure of the second wave cushion 2122 can release the gas in the portable pressure bottle 21 such that the top cover 218 may not be bounced off suddenly by an excessively strong gas.

With reference to FIG. 2D, the fourth accommodation slot 2263 includes a second gas relief hole 2263A and is provided a second pressure relief assembly 229, and the second pressure relief assembly 229 comprises a second rotatable connection assembly 2291, a second abutting assembly 2292 and a second spring assembly 2293. Wherein the second rotatable connection assembly 2291 is rotatably connected to one end of the fourth accommodation slot 2263 and includes a second through hole 2291A. The second abutting assembly 2292 is contained inside another end of the fourth accommodation slot 2263. One end of the second spring assembly 2293 abuts against the second rotatable connection assembly 2291 and another end abuts against the second abutting assembly 2292. Wherein the second abutting assembly 2292 seals the second gas relief hole 2263A by the elasticity of the first spring assembly 2293. As such, when the inner pressure of the second container body 2261 is excessive (excessive gas is emitted from the nozzle 91), the second pressure relief assembly 229 can exhaust excess gas to help relieve pressure (by the way similar to the first pressure relief assembly 219).

Figure 16A:
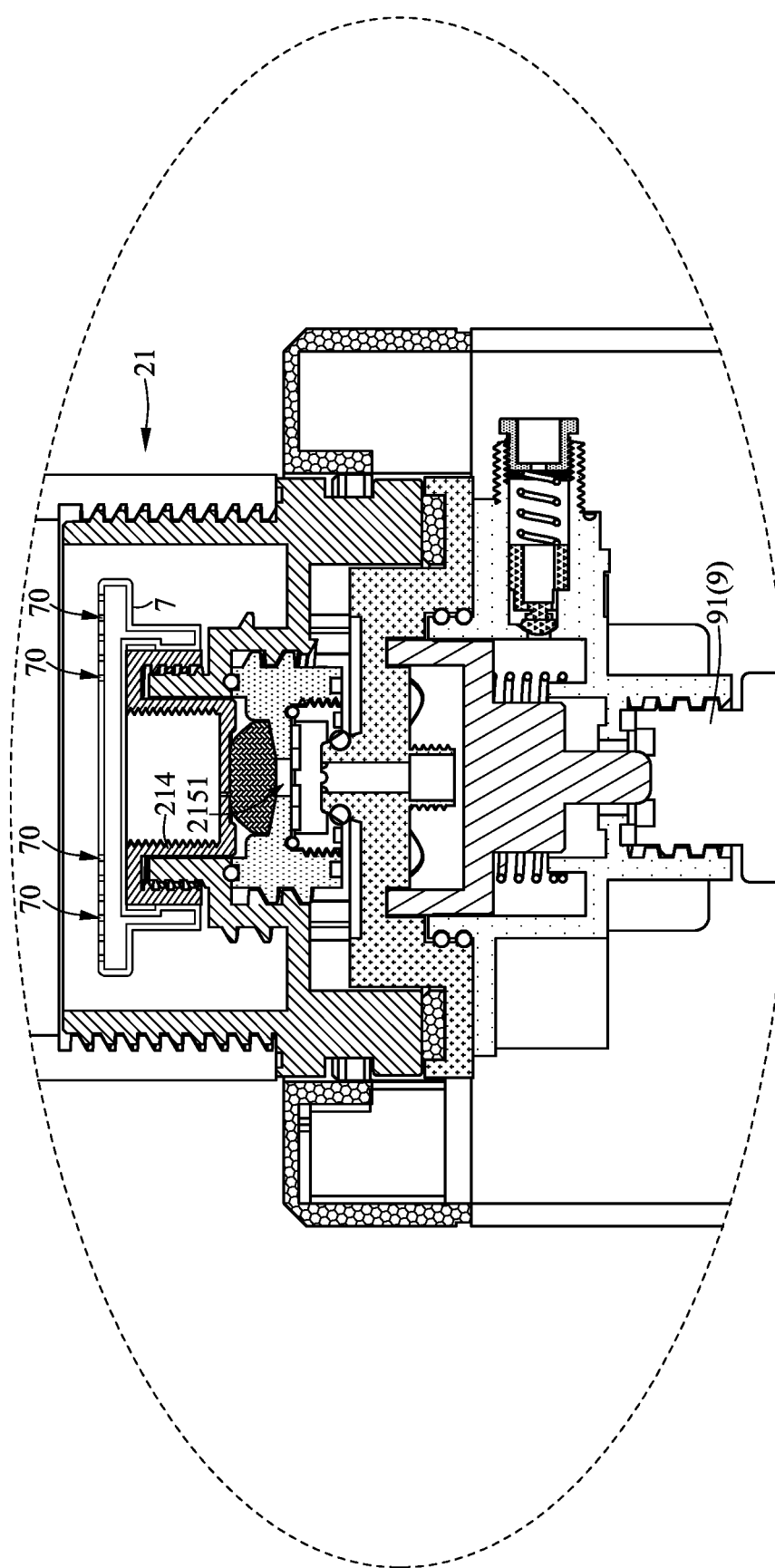
FIG. 16A illustrates a view in which rotation disk 7 is nested above upper positioning assembly 214.
Figure 16B:
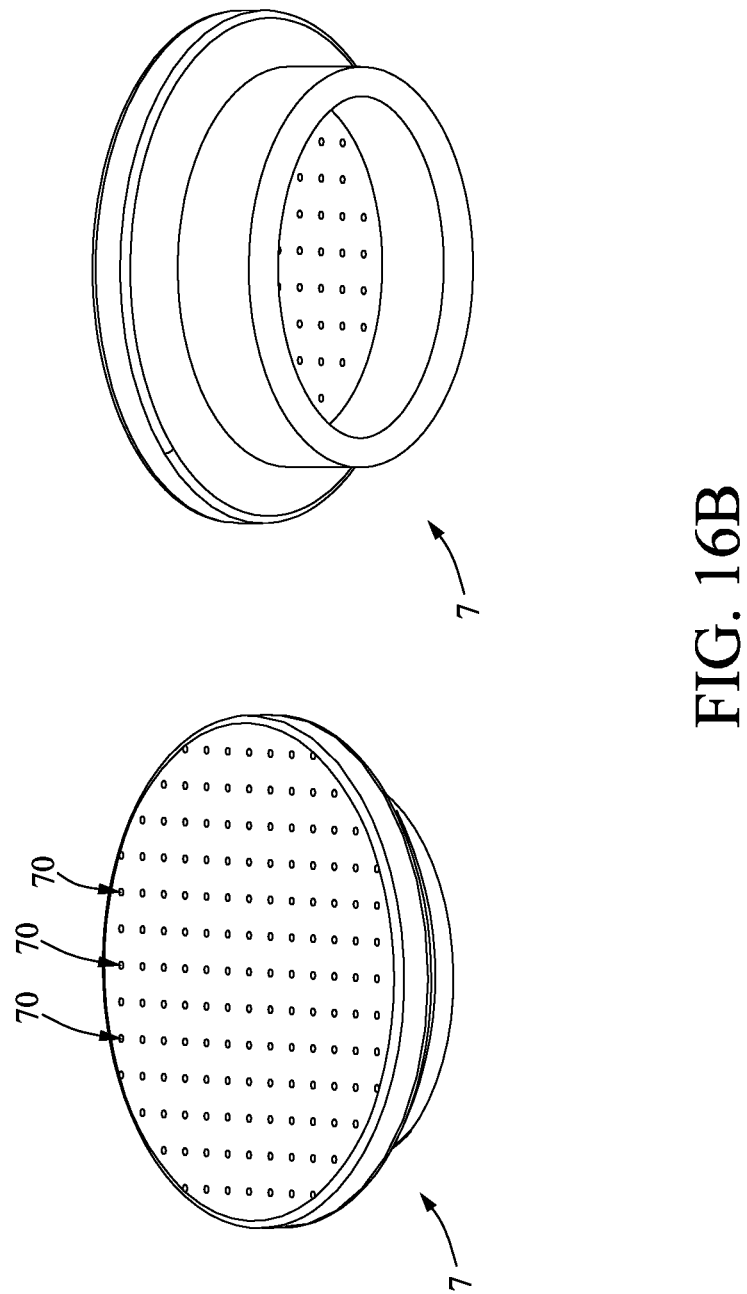
FIG. 16B illustrates a stereoscopic view of rotation disk 7.

With reference to FIGS. 16A and 16B, wherein FIG. 16A illustrates a view in which rotation disk 7 is nested above upper positioning assembly 214 and FIG. 16B illustrates a stereoscopic view of rotation disk 7. In other embodiments, the portable pressure bottle 21 of the bubble water machine 2 further comprises a rotation disk 7 nested above the upper positioning assembly 214, and the rotation disk 7 has a plurality of circular holes 70 on the surface. Wherein when the first intake passage 2151 releases gas, the gas may drive the rotation disk 7 to self-rotate and the gas may also enter into the liquid 8 through the circular holes 70. Thus, the rotation disk 7 can help in stirring the liquid 8 to make the gas enter uniformly into the liquid 8.

Figure 17A:
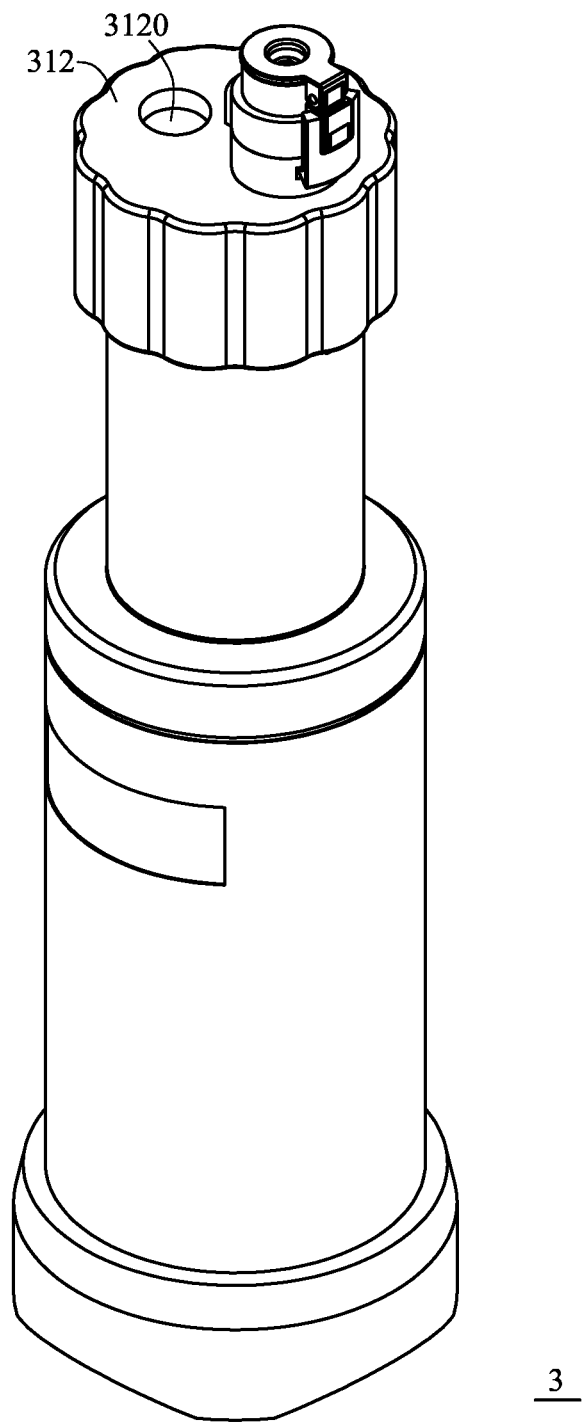
FIG. 17A illustrates a stereoscopic view of the bubble water machine 3 according to another embodiment.
Figure 17B:
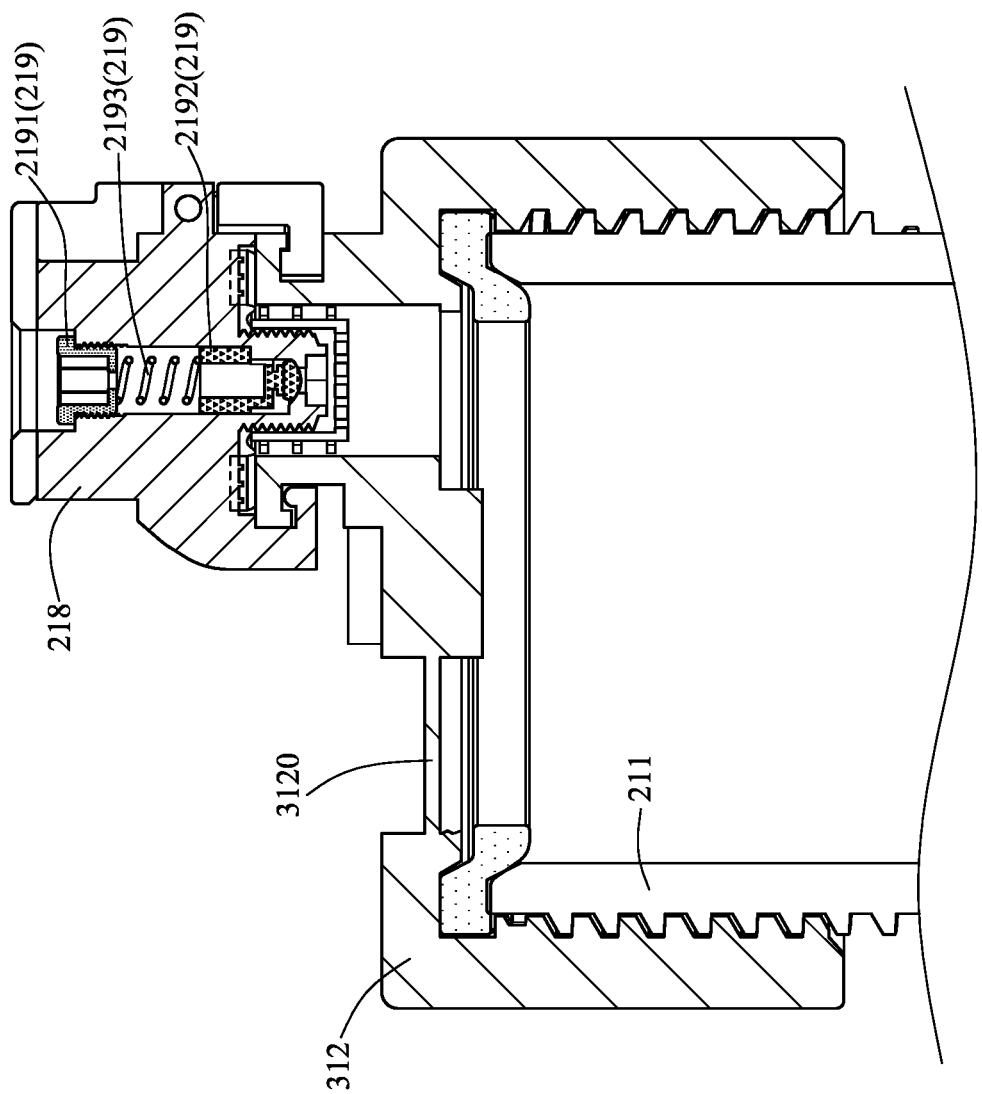
FIG. 17B illustrates a view of ultra-thin area 3120 of top cover 312.

With reference to FIGS. 17A and 17B, wherein FIG. 17A illustrates a stereoscopic view of the bubble water machine 3 according to another embodiment and FIG. 17B illustrates a view of ultra-thin area 3120 of top cover 312. The bubble water machine 3 is different from the bubble water machine 2 in that the top cover 312 of the bubble water machine 3 further comprises an ultra-thin area 3120 which has a thickness smaller than the casing thickness of the first container body 211. Therefore, when the first pressure relief assembly 219 is unable to exhaust the gas effectively, the gas inside the first container body 211 may break through the ultra-thin area 3120 firstly such that the liquid 8 may not rush downward back into the inflation area 22 and not damage the first container body 211.

While the invention has been described by means of specific embodiments, numerous modifications and variations could be made thereto by those skilled in the art without departing from the scope and spirit of the invention set forth in the claims.

What is claimed is:
1. A bubble water machine, characterized by comprising:
a pressure bottle comprising:
a first container body used to contain a liquid;
a top cover rotatably connected to an upper end of the first container body;
a first base rotatably connected to a lower end of the first container body, the first base being provided with a rotatable connection assembly extending into the first container body; the rotatable connection assembly includes an upper rotatable connection portion and a lower rotatable connection portion;
an upper positioning assembly rotatably connected to the upper rotatable connection portion and having a balanced pressure structure;
a lower positioning assembly rotatably connected to the lower rotatable connection portion and including a first intake passage;
a plug, the balanced pressure structure abutting against a top of the plug and a bottom of the plug covering the first intake passage;
an inflation area comprising:
a second container body containing an inflation bottle including a nozzle;
a second base connected to the first base in a rotary engagement manner;
a first intermediary assembly including a second intake passage connected communicatably with the first intake passage;
a second intermediary assembly including a trigger block and a plurality of third intake passages which are interconnected with the second intake passage;
a third intermediary assembly including:
a second accommodation slot arranged with a third spring assembly inside, one end of the third spring assembly abutting against the second intermediary assembly;
a third accommodation slot located just below the second accommodation and used for rotatably connecting the nozzle, and between the second accommodation slot and the third accommodation slot being a third through hole, through which the trigger block passes.
2. The bubble water machine according to claim 1, characterized in that the balanced pressure structure is constituted by a U-shaped plate structure and an elongated plate structure abutting against a center of the top of the plug.

3. The bubble water machine according to claim 1, characterized in that an upper end of the second intermediary assembly abuts against the first intermediary assembly, and the first intermediary assembly drives the second intermediary assembly to move downward to allow the trigger block to contact the nozzle when the first base is rotatably engaged with the second base.

4. The bubble water machine according to claim 1, characterized in that the second base is provided with at least one feedback assembly and further includes an extrusion block corresponding to the feedback assembly while the first base further includes a push block corresponding to the feedback assembly; wherein the feedback assembly includes:
a linkage casing, the push block abutting against the linkage casing;
an elongated block, one end of the elongated block being connected to an inner surface of the linkage casing; and
a fourth spring assembly nested on the elongated block, the pressure block abutting against one end of the fourth spring assembly and the pressure block being adjacent to the end of the elongated block which is not connected with the linkage casing.

5. The bubble water machine according to claim 1, characterized in that the top cover includes a projected tubular block connected with a pressure relief cover body which includes inside a first accommodation slot including a first gas relief hole at a lower part and being provided inside a first pressure relief assembly, the first pressure relief assembly comprising:
a first rotatable connection assembly rotatably connected to an upper part of the first accommodation slot and including a first through hole;
a first abutting assembly contained inside the first accommodation slot;
a first spring assembly, one end of the first spring assembly abutting against the first rotatable connection assembly and another end abutting against the first abutting assembly;
wherein the first abutting assembly seals the first gas relief hole by an elasticity of the first spring assembly.

6. The bubble water machine according to claim 1, characterized in that the third intermediary assembly includes inside a fourth accommodation slot including a second gas relief hole at a lower part and being provided inside a second pressure relief assembly, the second pressure relief assembly comprising:
a second rotatable connection assembly rotatably connected to one end of the fourth accommodation slot and including a second through hole;
a second abutting assembly contained inside another end of the fourth accommodation slot;
a second spring assembly, one end of the second spring assembly abutting against the second rotatable connection assembly and another end abutting against the second abutting assembly;
wherein the second abutting assembly seals the second gas relief hole by an elasticity of the second spring assembly.

7. The bubble water machine according to claim 1, characterized in that a portable pressure bottle further comprises a rotation disk nested above the upper positioning assembly.

8. The bubble water machine according to claim 1, characterized in that the top cover includes an ultra-thin area, which has a thickness smaller than a casing thickness of the first container body.

9. A portable pressure bottle, characterized by comprising:
a first container body used to contain a liquid;
a top cover rotatably connected to an upper end of the first container body;
a first base rotatably connected to a lower end of the first container body, the first base being provided with a rotatable connection assembly extending into the first container body which includes an upper rotatable connection portion and a lower rotatable connection portion;
an upper positioning assembly rotatably connected to the upper rotatable connection portion and having a balanced pressure structure;
a lower positioning assembly rotatably connected to the lower rotatable connection portion and including a first intake passage; and
a plug, the balanced pressure structure abutting against a top of the plug and a bottom of the plug covering the first intake passage;
wherein the balanced pressure structure is constituted by a U-shaped plate structure and an elongated plate structure abutting against a center of the top of the plug.

10. The portable pressure bottle according to claim 9, characterized in that it further comprises a first wave cushion arranged between an edge of the upper end of the first container body and the top cover.

11. The portable pressure bottle according to claim 9, characterized in that the top cover projects a tubular block connected with a pressure relief cover body which includes inside a first accommodation slot including a first gas relief hole at the lower part and being provided inside a first pressure relief assembly, the first pressure relief assembly comprising:
a first rotatable connection assembly rotatably connected to an upper part of the first accommodation slot and including a first through hole;
a first abutting assembly contained below the first accommodation slot;
a first spring assembly, one end of the first spring assembly abutting against the first rotatable connection assembly and another end abutting against the first abutting assembly;
wherein the first abutting assembly seals the first gas relief hole by an elasticity of the first spring assembly.

12. The portable pressure bottle according to claim 11, characterized in that the first abutting assembly includes an air guide hole and the pressure relief further includes a clear block located in the first accommodation slot; the clear block is adjacent closely to the air guide hole when the first abutting assembly seals the first gas relief hole.

13. The portable pressure bottle according to claim 11, further comprises a filter assembly, the filter assembly arranged below the first accommodation slot and including a plurality of filter holes.

14. The portable pressure bottle according to claim 11, further comprises a second wave cushion, the second wave cushion arranged between an edge of the upper end of the tubular block and the pressure relief cover body.

* * * * *